United States Patent
Karaoguz et al.

(10) Patent No.: US 9,113,443 B2
(45) Date of Patent: *Aug. 18, 2015

(54) VIEW SHARING BETWEEN IN-RANGE DEVICES

(71) Applicant: Broadcom Corporation, Irvine, CA (US)

(72) Inventors: Jeyhan Karaoguz, Irvine, CA (US); James D. Bennett, Hroznetin (CZ); Nambi Seshadri, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 320 days.

This patent is subject to a terminal disclaimer.

(21) Appl. No.: 13/711,832

(22) Filed: Dec. 12, 2012

(65) Prior Publication Data

US 2013/0124741 A1    May 16, 2013

Related U.S. Application Data (63) Continuation of application No. 13/041,708, filed on Mar. 7, 2011, now Pat. No. 8,340,066, which is a continuation of application No. 10/885,405, filed on Jul. 6, 2004, now Pat. No. 7,920,528.

(60) Provisional application No. 60/505,276, filed on Sep. 23, 2003.

(51) Int. Cl.
| | |
|---|---|
| *H04W 4/00* | (2009.01) |
| *H04W 76/02* | (2009.01) |
| *H04L 29/06* | (2006.01) |
| *H04N 1/00* | (2006.01) |
| *H04N 1/42* | (2006.01) |
| *H04W 12/08* | (2009.01) |
| *H04L 29/08* | (2006.01) |
| *H04W 12/06* | (2009.01) |

(52) U.S. Cl.
CPC ........... *H04W 76/02* (2013.01); *H04L 63/0492* (2013.01); *H04L 63/10* (2013.01); *H04L 67/04* (2013.01); *H04L 67/36* (2013.01); *H04N 1/00315* (2013.01); *H04N 1/42* (2013.01); *H04W 4/00* (2013.01); *H04W 12/08* (2013.01); *H04L 63/08* (2013.01); *H04W 12/06* (2013.01)

(58) Field of Classification Search
USPC ................. 455/418, 419, 420; 370/328, 338; 709/208
See application file for complete search history.

(56) References Cited

U.S. PATENT DOCUMENTS

| | | | |
|---|---|---|---|
| 6,911,987 B1 | 6/2005 | Mairs et al. | |
| 7,007,235 B1 | 2/2006 | Hussein et al. | |
| 7,046,134 B2 | 5/2006 | Hansen | |
| 8,340,066 B2 * | 12/2012 | Karaoguz et al. | 370/338 |
| 2003/0054794 A1 | 3/2003 | Zhang | |
| 2004/0049547 A1 * | 3/2004 | Matthews et al. | 709/206 |
| 2004/0179036 A1 | 9/2004 | Teplov et al. | |

(Continued)

*Primary Examiner* — Justin Lee
(74) *Attorney, Agent, or Firm* — Brinks Gilson & Lione (57) ABSTRACT

A first system may receive a view from a second system. The first system may establish a direct wireless communication link with the second system that does not connect through any intermediate system between the first system and the second system. Through the direct wireless communication link, the first system sends a view sharing request to the second system. The view sharing request may specify a view that is displayed by the second system and not the first system. The first system may receive view information corresponding to the view and display the view according to the received view information.

24 Claims, 6 Drawing Sheets

(56) References Cited

U.S. PATENT DOCUMENTS

| | | |
|---|---|---|
| 2005/0063351 A1 | 3/2005 | Karaoguz et al. |
| 2005/0136949 A1* | 6/2005 | Barnes, Jr. .................. 455/461 |
| 2008/0294641 A1 | 11/2008 | Kim |

* cited by examiner

VIEW SHARING BETWEEN IN-RANGE DEVICES

1. CROSS REFERENCE TO RELATED APPLICATIONS

This application is continuation of and claims the benefit of priority to U.S. application Ser. No. 13/041,708 filed Mar. 7, 2011, which is a continuation of and claims the benefit of priority to U.S. application Ser. No. 10/885,405 filed Jul. 6, 2004, now U.S. Pat. No. 7,920,528, which is a non-provisional of and claims the benefit of priority to U.S. Application Ser. No. 60/505,276 filed Sep. 23, 2003, the contents of each of which are hereby incorporated herein by reference in their entirety.

2. BACKGROUND

In a dynamic wireless network environment, resources and their associated users may generally freely enter and leave a wireless network. For example, a user of a portable computer resource may enter a conference room having a personal area network. Also for example, a user of an office computing station may explicitly command the office computing station to join a dynamic wireless network. Additionally, for example, a portable network resource having power save capability may exit a dormant power save state and begin participating in a wireless communication network.

Various users in such a dynamic wireless communication network may desire to communicate a variety of information with other users in the dynamic network. In various scenarios, for example, a team of users may contribute to the creation of a common document or presentation.

DETAILED DESCRIPTION

Figure 1:
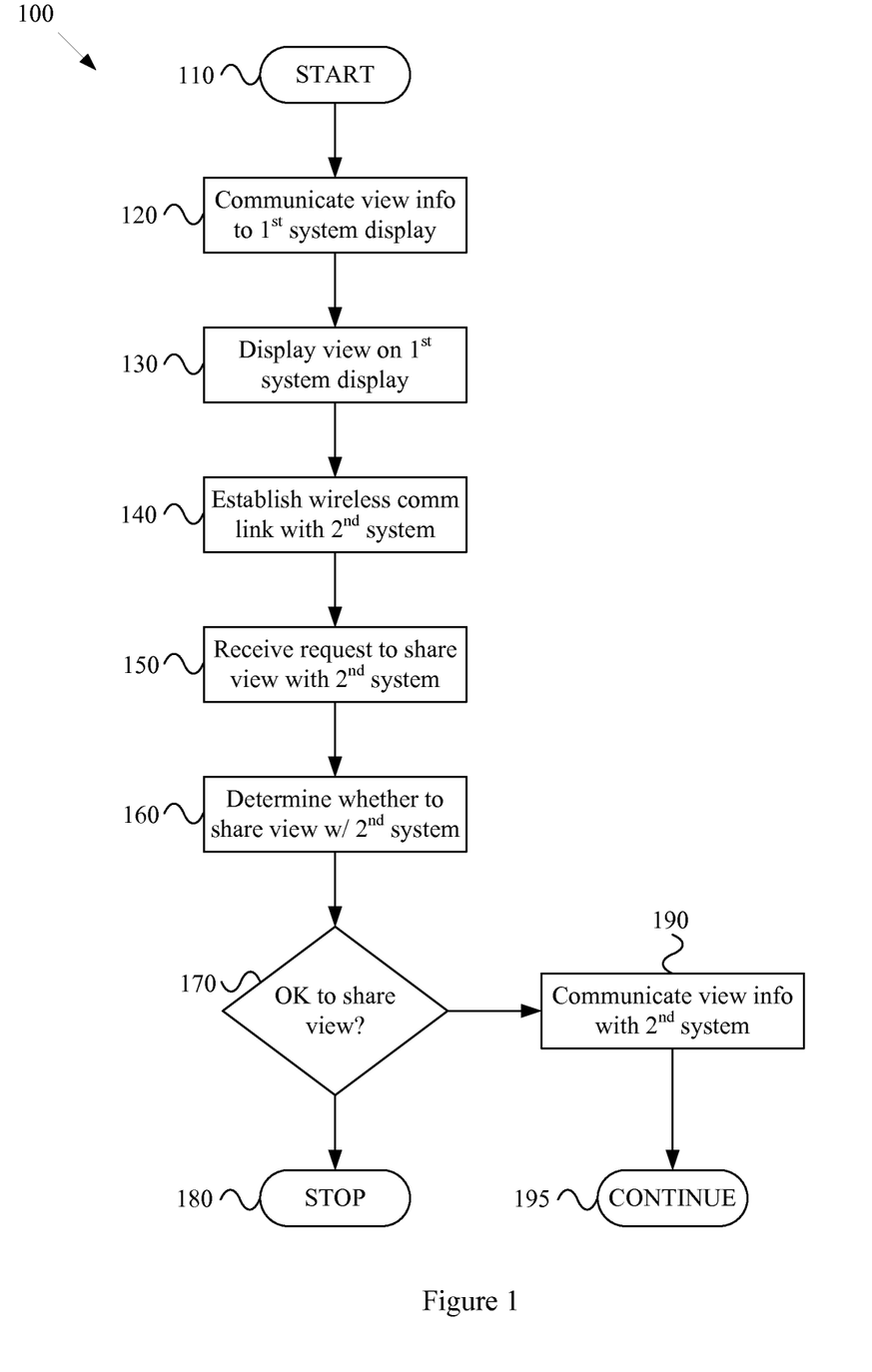
FIG. 1 is a flow diagram illustrating a method for a first system in a wireless communication network to share a view with a second system, in accordance with various aspects of the present invention.

FIG. 1 is a flow diagram illustrating a method 100 for a first system in a wireless communication network to share a view with a second system, in accordance with various aspects of the present invention. The method 100 begins at step 110. Various events and conditions may cause the method 100 to begin. For example, a user of the first system or the second system may request that the first system share a view with the second system. Alternatively, for example, the first and/or second system may be configured to automatically share a view under particular triggering circumstances. Generally, the method 100 may be initiated for a variety of reasons. Accordingly, the scope of various aspects of the present invention should not be limited by characteristics of particular initiating events or conditions.

The method 100, at step 120, may comprise communicating information of a view to a display resource of the first system. The following discussion will often refer to views and view sharing. Additionally, the following discussion will also refer to various exemplary scenarios that may comprise sharing a view of a document (e.g., a word processing document, presentation document, or graphics document). Information of such an exemplary document view may, for example, be generated by a document processing application executing on the first system. It should be noted that the scope of various aspects of the present invention should not be limited by characteristics of a particular view or by how such a view may be presented to a user by various systems.

The method 100, at step 130, may comprise displaying the view on the display resource of the first system. Characteristics of the view may change at various points in the viewing process. The view may be dynamic or static. That is, the view may comprise an image that is not changing and/or an image that is changing. In general, the view may comprise any of a large variety of view characteristics.

For example, in an exemplary scenario, the display resource may present a view to a user in a window format. A user may then, for example, vary characteristics of the view and/or window. For example and without limitation, the user may alter the dimensions of the window or reduce the view to an icon when not immediately using the view. Alternatively, for example, a view may occupy an entire display screen or multiple screens of the display resource.

The method 100, at step 140, may comprise establishing a two-way wireless communication link between the first system and the second system. Such a wireless communication link may, for example, comprise a direct wireless communication link between the first system and the second system. The following discussion will generally discuss a two-system scenario for the sake of clarity. However, various aspects of the present invention readily extend to dynamic wireless communication networks comprising more than two systems. For example and without limitation, the first system may share a view with two other systems, three other systems, or other number of systems in one or more dynamic wireless communication networks. Accordingly, the scope of various aspects of the present invention should not be limited by characteristics of view sharing between only two systems.

Step 140 may comprise establishing the two-way wireless communication link between the first system and the second system using a variety of media and protocols. For example, the two-way wireless communication link may comprise an RF communication link and/or an optical communication link. Also for example, the two-way wireless communication link may be based on any of a large number of standard or propriety communication protocols. Various standard communication protocols may, for example, comprise IEEE 802.11, 802.15, Bluetooth, or ultra-wideband (UWB) communication protocols. Accordingly, the scope of various aspects of the present invention should not be limited by characteristics of a particular wireless communication medium and/or communication protocol.

The method 100, at step 150 may, for example, comprise the first system receiving a request for the first system to share a view with the second system. Such a request may, for example, originate from the first system or the second system (e.g., from a user of the first system or a user of the second system). In an exemplary scenario, a user of the second system may initiate a request from the second system to the first system for the first system to share a particular view or any view with the second system. In another exemplary scenario, the first system may communicate with the second system to ask the second system, or user thereof, whether the second system desires to share a particular view of the first system. In an additional exemplary scenario, a user of the first system may request the first system to share the view with the second system. In general, step 150 may comprise the first system receiving a request to share a view with the second system. Accordingly, the scope of various aspects of the present invention should not be limited by characteristics of a particular request (or source thereof) for sharing a view.

Still further, for example, the method 100 may comprise the first system communicating view information to the second system without an explicit request from the second system for the first system to share the view. In an exemplary scenario, a user of the first system may select the second system from a list of systems in the wireless communication network. The first system may respond to the user request by communicating information of the view to the second system without receiving a request from the second system. Accordingly, the scope of various aspects of the present invention should not be limited by whether or not the second system or user thereof requests the first system to share a view with the second system.

The method 100, at step 160, may comprise the first system determining whether to share the view with the second system. Step 160 may, for example, comprise determining whether the second system (e.g., including the user thereof) should have access to the view. For example and without limitation, step 160 may comprise the first system communicating with a user of the first system to determine whether the second system should have access to the view. Alternatively, for example, step 160 may comprise the first system analyzing a list of authorized systems and/or users to determine whether the second system should have access to the view. Such a list may, for example, be stored in memory accessible to the first system. Also for example, in a scenario involving sharing a view that comprises sensitive information, step 160 may comprise the first system analyzing secure communication capability of the second system to determine whether the second system has the necessary secure communication capability to protect the sensitive information in the view.

Further, for example, the first system may communicate a variety of authorization and authentication information with the second system. In general, step 160 may comprise performing any of a variety of authorization and/or authentication operations. Accordingly, the scope of various aspects of the present invention should not be limited by characteristics of particular ways of determining whether to share the view with the second system.

The method 100, at step 170, may comprise utilizing the determination made at step 160 to determine execution flow of the method 100. For example, if step 160 determines that the second system is not authorized to share the view, then step 170 may direct method 100 flow to step 180, which may terminate view share processing between the first system and the second system. Alternatively, if step 160 determines that the second system is authorized to share the view, then step 170 may direct method 100 flow to step 190.

The method 100, at step 190, may comprise the first system communicating information of the view to the second system. The first system may communicate information of the view to the second system in any of a variety of ways. For example and without limitation, the first system may communicate JPEG and/or MPEG encoded information to the second system. Also for example, the first system may communicate graphical and textual information to the second system. The first system may, for example, communicate information of the view to the second system over the wireless communication link established at step 140. Alternatively, for example, the first system may establish additional communication links or channels over which to communicate information of the view to the second system. Accordingly, the scope of various aspects of the present invention should not be limited by characteristics of particular view information types or characteristics of particular communication links or channels utilized to communicate the view information from the first system to the second system.

Step 190 may, for example, comprise establishing a secure wireless communication link (e.g., one-way or two-way) between the first system and the second system. For example, in a scenario where the shared view comprises sensitive information, step 190 may comprise establishing a secure communication link comprising encryption and decryption of at least the sensitive information in the shared view. Step 190 may, for example, comprise adding secure communication aspects to the wireless communication link established at step 140.

The method, at step 195, may comprise performing additional process steps that may, for example, comprise utilizing the shared view. For example, the first and/or second system may communicate to modify and/or edit the shared view. For example, the first system may provide the second system (e.g., a user thereof) the capability to modify aspects of the original shared view at the first system. The first system may then, for example, receive view modification information from the second system.

In one exemplary scenario, the first system may provide the second system the ability to control movement of the original view at the first system. The first system may then, for example, receive view modification information from the second system. In another exemplary scenario, the first system may provide the second system the ability to edit a document in the original view at the first system. The first system may then, for example, receive document-editing information from the second system.

Figure 2:
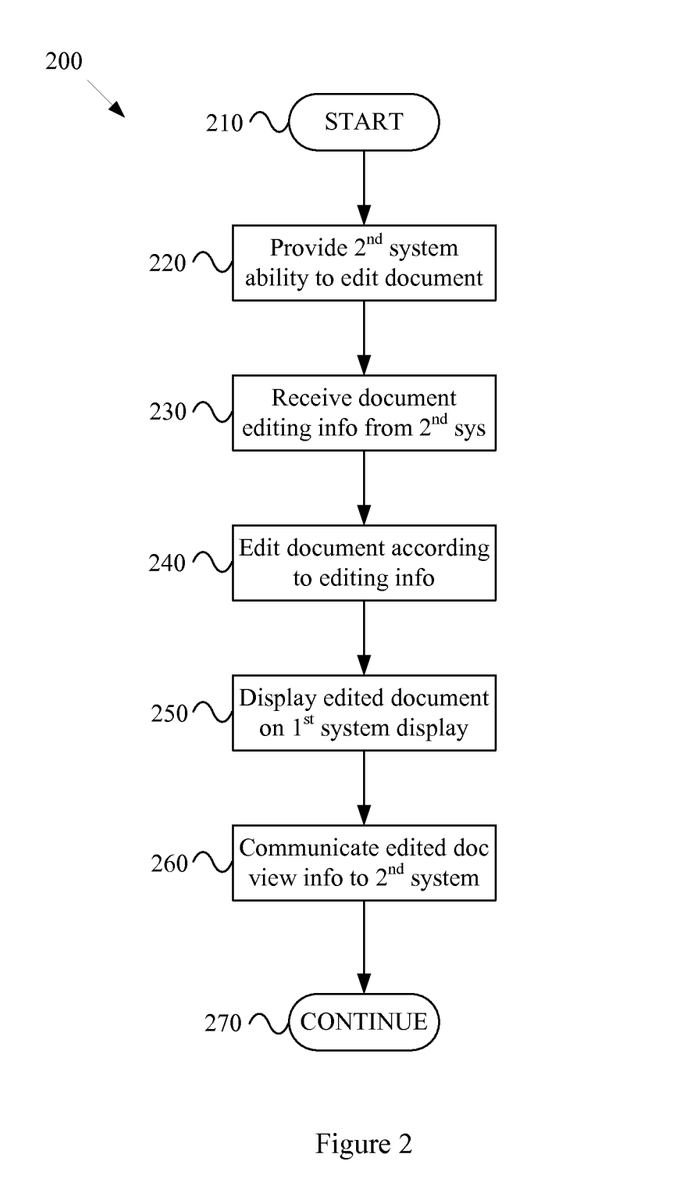
FIG. 2 is a flow diagram illustrating a method for a first system in a wireless communication network to provide a second system with the capability to edit a document in a shared view, in accordance with various aspects of the present invention.

The following discussion will present the method 200 illustrated in FIG. 2 as an example of such continued processing. Note, however, that the method 200 is merely an example, and should by no means limit the scope of various aspects of the present invention.

FIG. 2 is a flow diagram illustrating a method 200 for a first system in a wireless communication network to provide a second system with the capability to edit a document in a shared view, in accordance with various aspects of the present invention.

The method 200 begins at step 210. Various events and conditions may cause the method 200 to begin. For example, the first system may be operating in accordance with step 195 of the method 100 illustrated in FIG. 1 and discussed previously. Alternatively, for example, a user of the first system may direct the first system to provide document-editing capability to the second system. Also for example, the second system may have the ability to acquire the document editing capability without a directive from the first system. Further for example, a third moderating system may provide the second system with the capability to edit a document in a shared view. Generally, the method 200 may be initiated for a variety of reasons. Accordingly, the scope of various aspects of the present invention should not be limited by characteristics of particular initiating events, conditions or systems.

The exemplary method 200, at step 220, comprises the first system providing to the second system the capability to edit a document in a shared view. The first system may, for example, communicate to the second system that the second system (e.g., a user thereof) may edit the document in the shared view. As an example, the first system may pass a token to the second system indicating that the second system has editing privileges for the document.

Step 220 may also comprise initializing various operational and communicational characteristics of the first system to be able to receive and process document editing information received from the second system. Such initialization may comprise, for example, initializing a communication link over which such document editing information may be communicated (e.g., a secure communication link for editing a sensitive document). In general, step 220 may comprise the first system providing to the second system the capability to edit a document in a shared view. Accordingly, the scope of various aspects of the present invention should not be limited by characteristics of a particular way of providing document-editing capability to the second system.

The method 200, at step 230, may comprise receiving document editing information from the second system. For example, a user of the second system may use a user interface device of the second system to type, modify graphics, cut and paste elements, and generally perform any editing capability as though the document and associated processing application were residing on the second system. This may be the case, for example, even though the second system may not include the data associated with the original document or the particular document processing application that is generating the original view of the document at the first system. Step 230 may, for example, comprise receiving document editing information from the second system. Accordingly, the scope of various aspects of the present invention should not be limited by characteristics of particular types of editing information or particular ways of communicating such information.

The method 200, at step 240, may comprise editing the original document of the view according to document editing information received from the second system at step 230. For example, the first system may receive any of a large variety of editing commands from the second system (e.g., cut, paste, delete, insert text, cursor movement, drawing selection, etc.). Step 240 may, for example, comprise the first system processing the editing commands from the second system as though the commands were originating at the first system. For example, the document processing application generating the document on the first system may not be aware of the source of the editing commands.

In an exemplary illustration, view-sharing functionality of the first system may create an editing command path between the wireless communication link with the second system and a document processing application executing on the first system. The view-sharing functionality may then replace the typical editing command path from the user interface of the first system with the command path from the wireless communication link. In general, step 240 may comprise editing the original document of the view according to document editing information received from the second system at step 230. Accordingly, the scope of various aspects of the present invention should not be limited by characteristics of particular ways of processing such editing commands.

The method 200, at step 250, may comprise displaying the edited document from step 240 on a display device of the first system. For example, after editing the document of the view according to the editing instructions from the second system at step 240, the first system may communicate information of the edited document and/or view thereof to a display device of the first system for display to a user. In such an exemplary scenario, a user of the first system can view changes made to a document by a user of the second system.

The method 200, at step 260, may comprise communicating information of the view comprising the edited document to the second system. For example, after editing the document of the view according to the editing instructions from the second system at step 240, the first system may communicate information of the edited document and/or view thereof to the second system. Such communication may, for example, occur in a manner similar to that discussed with regard to step 190 of the method 100 illustrated in FIG. 1 and discussed previously. In such an exemplary scenario, a user of the second system that is generating the document editing commands may view the document modifications resulting from the user's editing commands in real-time as the user is generating the editing commands.

The method 200, at step 260, may then continue processing the shared view, for example, in accordance with further commands from a user of the second system and/or user of the first system.

Figure 3:
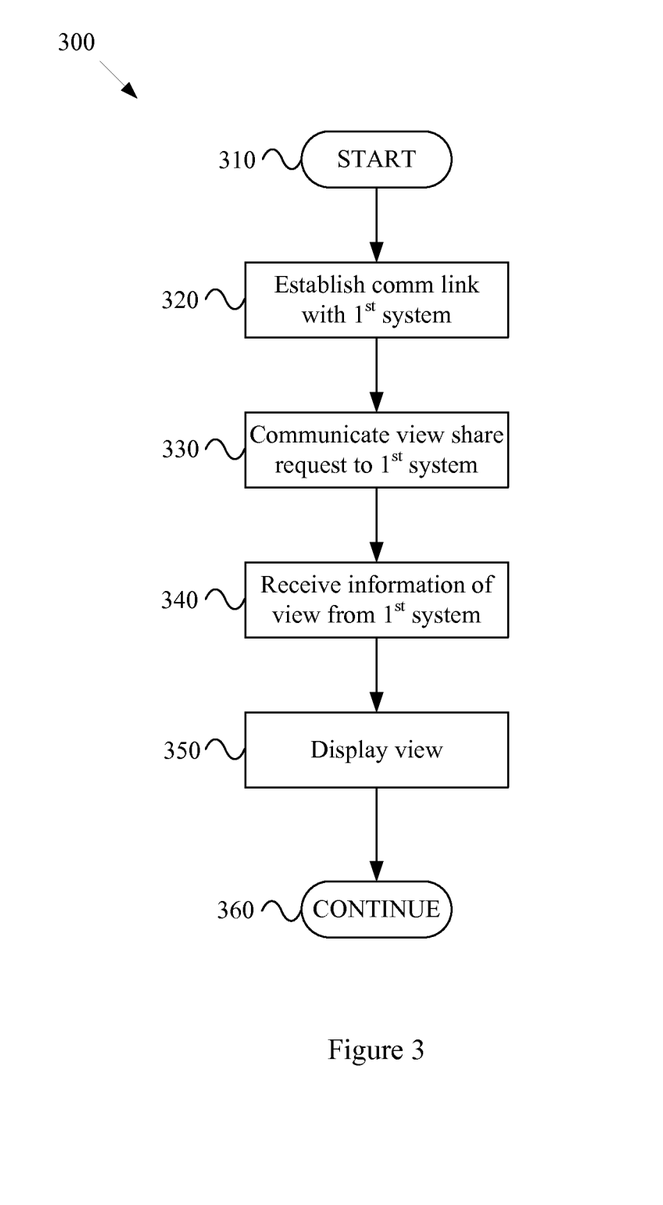
FIG. 3 is a flow diagram illustrating a method for a second system in a wireless communication network to share a first system's view, in accordance with various aspects of the present invention.

FIG. 3 is a flow diagram illustrating a method for a second system in a wireless communication network to share a first system's view, in accordance with various aspects of the present invention. The method 300 begins at step 310. Various events and conditions may cause the method 300 to begin. For example, a user of the first system or the second system may request that the first system share a view with the second system. Alternatively, for example, the first and second systems may be configured to automatically share a view under particular triggering circumstances. Generally, the method 300 may be initiated for a variety of reasons. Accordingly, the scope of various aspects of the present invention should not be limited by characteristics of particular initiating events or conditions.

The method 300, at step 320, may comprise establishing a two-way wireless communication link with the first system. Such a two-way wireless communication link may, for example, comprise a direct communication link between the second and first systems. Step 320 may, for example and without limitation, share various aspects with step 140 of the method 100 illustrated in FIG. 1 and discussed previously. Step 320 (or a subsequent step) may comprise integrating secure communication functionality into the two-way wireless communication link. For example, in an exemplary scenario where information of the shared view (or other communicated information) is sensitive, the second system may communicate with the first system to establish a secure communication link between the second system and the first system. Such a secure communication link may, for example, comprise performing any of a large variety of secure communication techniques (e.g., encryption and frequency hopping). Accordingly, the scope of various aspects of the present invention should not be limited by characteristics of particular secure communication techniques.

Step 320 (or a subsequent step) may comprise communicating secure access information with the first system. For example, in an exemplary scenario where the shared view comprises sensitive information, or where other communicated information between the second system and the first system may be sensitive, the first system may require that the second system (or user thereof) be authorized to access the view. For example and without limitation, the first system may have access to a list of authorized systems and/or users that may access the view.

The first system may, for example, require the second system to communicate any of a variety of secure access information (e.g., authorization or authentication information) to the first system. Such information may, for example, comprise system identification information and user identification information (e.g., user ID and password, retinal scan, thumb print, facial pattern information, voice pattern information, etc.). The second system may communicate any necessary secure access information to the first system for the first system to utilize in determining whether the second system should be allowed access to the view. Step 320 may, for example, generally comprise communicating secure access information with the first system. Accordingly, the scope of various aspects of the present invention should not be limited by characteristics of particular secure access information, communication or processing techniques.

The method 300, at step 330, may comprise communicating a request to the first system for the first system to share a view with the second system (e.g., a view that the first system is currently displaying). Such a request, for example, may comprise an open request for a view or may comprise a request for a specific view. Such a request may, for example, originate from a user of the second system. Such a request may, for example, be in response to an offer to provide a view that is communicated to the second system by the first system. The second system may, for example, communicate such a request to the first system over the wireless communication link established at step 320. In general, step 330 may comprise the second system communicating a request to the first system to share a view with the second system. Accordingly, the scope of various aspects of the present invention should not be limited by characteristics of a particular request, request type, request source, or way of communicating such a request.

As mentioned previously, a view may comprise any of a large variety of view characteristics. A view may, for example, comprise dynamic or static image information. A view may, for example, comprise a view of a document (e.g., a document generated by a document processing application executing on the first system). A view may, for example, comprise textual, graphical or pictorial aspects. A view may, for example, comprise image information in a window format or may comprise image information for an entire display screen (or multiple screens). Accordingly, the scope of various aspects of the present invention should not be limited by characteristics of a particular view or view type.

The method 300, at step 340, may comprise receiving information of the view from the first system. Such information may, for example, have been communicated to the second system by the first system in accordance with method step 190 of the method 100 illustrated in FIG. 1 and discussed previously. The second system may receive information of the view in a variety of ways. For example and without limitation, the second system may receive JPEG and/or MPEG encoded information from the first system. Also for example, the second system may receive graphical, textual or pictorial information from the first system.

The second system may, for example, receive information of the view over the wireless communication link (or secure channel thereof) established at step 320. Alternatively, for example, the second system and first system may establish additional communication links or channels over which to communicate information of the view to the second system.

In general, step 340 may comprise receiving information of the view from the first system. Accordingly, the scope of various aspects of the present invention should not be limited by characteristics of a particular view, view type or way of communicating information of a view.

The method 300, at step 350, may comprise displaying the view on a display device of the second system. Characteristics of the view may change at various points in the viewing process. As mentioned previously, the view may comprise any of a large variety of view characteristics. The second system may, for example, provide a user of the second system the capability to adjust certain characteristics of the displayed view (e.g., view size, or changing a view between window form and icon form).

For example, in an exemplary scenario, the display device of the second system may present a view to a user in a window format. The user may then, for example, vary characteristics of the view and/or window. For example and without limitation, the user may alter the dimensions of the window or reduce the view to an icon when not immediately using the view. Alternatively, for example, a view may occupy an entire display screen or multiple screens of the display device.

In general, step 350 may comprise the second system displaying the view on a display device. Accordingly, the scope of various aspects of the present invention should not be limited by characteristics of a particular view, view display, or way of displaying a view.

The method 300, at step 360, may comprise performing continued processing. For example and without limitation, step 360 may comprise receiving an indication from the first system indicating that the second system may control the original view of the first system. In an exemplary scenario, the first system may provide the second system the capability to move the original view of the first system (e.g., scrolling, slide turning, sizing, etc.). In another exemplary scenario in which the shared view comprises a view of a document, the first system may provide the second system the capability to edit the original document. The following discussion of the method 400 shown in FIG. 4 will focus on an exemplary document-editing scenario. However, it should be noted that the scope of various aspects of the present invention should not be limited by characteristics discussed with regard to the exemplary method 400.

Figure 4:
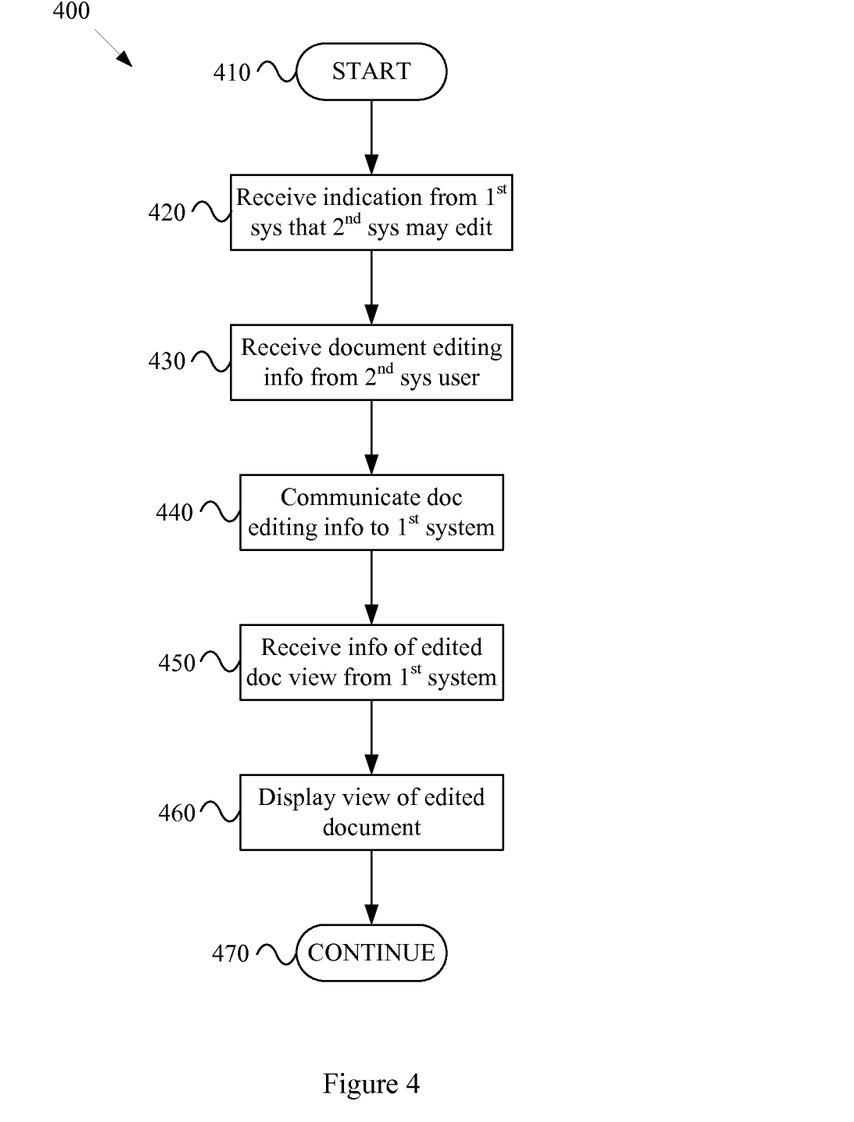
FIG. 4 is a flow diagram illustrating a method for a second system in a wireless communication network to share a first system's document view and document editing capability, in accordance with various aspects of the present invention.

FIG. 4 is a flow diagram illustrating a method 400 for a second system in a wireless communication network to share a first system's document view and document editing capability, in accordance with various aspects of the present invention.

The method 400 may begin at step 410. Various events and conditions may cause the method 400 to begin. For example, the first system may be performing processing in accordance with step 360 of the method 300 illustrated in FIG. 3 and discussed previously. Alternatively, for example, a user of the first system may direct the first system to provide document-editing capability to the second system. Also for example, the second system may have the ability to acquire the document editing capability without a directive from the first system. Further for example, a third moderating system may provide the second system with the capability to edit a document in a shared view. Generally, the method 400 may be initiated for a variety of causes and conditions. Accordingly, the scope of various aspects of the present invention should not be limited by characteristics of particular initiating events or conditions.

The method 400, at step 420, may comprise receiving an indication from the first system that the second system may edit a document of the shared view. For example, the indication may be communicated to the second system by a first system operating according to step 220 of the method 200 illustrated in FIG. 2 and discussed previously. The first system may, for example, communicate an indication to the second system indicating that the second system (e.g., a user thereof) may edit a document in the shared view. As an example, the second system may receive a token from the first system (or other system) indicating that the second system has editing privileges for the document.

Step 420 may also comprise initializing various operational and communicational characteristics of the second system to be able to receive and process document editing information (e.g., from a user of the second system) and provide such document editing information to the first system. Such characteristics may comprise, for example, initializing a communication link over which such document editing information may be communicated (e.g., a secure communication link for editing a sensitive document).

In general, step 420 may comprise the second system receiving an indication from the first system (or other system) indicating that the second system has the capability to edit a document in a shared view from the first system. Accordingly, the scope of various aspects of the present invention should not be limited by characteristics of a particular way of receiving document-editing capability from the first system.

The method 400, at step 430, may comprise receiving document editing information (e.g., commands) from a user of the second system. For example, a user of the second system may utilize a user interface device to communicate document-editing information to the second system. Such a user interface device may, for example, comprise a keyboard, mouse, voice recognition device, touch screen, touch pad, etc. Such document editing information may, for example, comprise textual information, pictorial information, graphical information, cursor information, etc. In general step 430 may comprise receiving document editing information from a user of the second system. Accordingly, the scope of various aspects of the present invention should not be limited by characteristics of a particular user interface device or a particular type of document editing information.

The method 400, at step 440, may comprise communicating document editing information to the first system. Step 440 may, for example, comprise communicating document editing information to a first system that is performing processing in accordance with step 230 of the method 200 illustrated in FIG. 2 and discussed previously. The document editing information may, for example, comprise any of a large variety of document editing information types, some of which were discussed previously with regard to step 430.

Step 440 may comprise communicating such document editing information to the first system in a variety of ways. For example, step 440 may comprise utilizing a wireless communication link between the second and first systems. Such a wireless communication link may, for example, comprise a wireless communication link as established at step 320 in the method 300 illustrated in FIG. 3 and discussed previously. For example, such a wireless communication link may comprise a secure wireless communication link.

In general, step 440 may comprise the second system communicating document-editing information with the first system. Accordingly, the scope of various aspects of the present invention should not be limited by characteristics of particular document editing information or ways of communicating such information.

The method 400, at step 450, may comprise receiving from the first system information of a view comprising a view of the edited document. Such information may, for example, have been communicated to the second system by a first system performing processing in accordance with step 260 of the method 200 illustrated in FIG. 2 and discussed previously. For example, the first system may have edited the document or modified a view thereof in accordance with the editing information communicated to the first system by the second system at step 440. Continuing the example, the first system may then have communicated information of the edited document or view to the second system.

In an exemplary scenario, a user of the second system may enter a keyboard command to delete a text character. The second system may receive editing information for the character deletion at step 430 and communicate such information to the first system at step 440. The first system may edit the document or view thereof according to the information of the text character deletion. The first system may then communicate information of the edited document or modified view to the second system, which may receive such modified view or edited document information at step 450.

In general, step 450 may comprise receiving information of the edited document (or modified view thereof) from the first system. Accordingly, the scope of various aspects of the present invention should not be limited by characteristics of particular editing (or view modification) information, editing information communication or editing information processing.

The method 400, at step 460, may comprise displaying the view comprising a view of the edited document on a display device. For example, this may enable a user of the second system to enter editing commands and view the effects of the editing commands in an expedient manner (e.g., in near real-time). Step 460 may, for example, share various view displaying characteristics with steps 350, 250 and 130 as illustrated in FIGS. 1-3 and discussed previously. The displayed view may, for example, comprise any of a variety of view characteristics as discussed previously. In general, step 460 may comprise displaying a view of the edited document or modified view thereof. Accordingly, the scope of various aspects of the present invention should not be limited by characteristics of a particular view or way of displaying such a view.

The method 400, at step 470, may comprise performing continued processing. For example and without limitation, step 470 may comprise performing additional editing of the document using the second system. Step 470 may also, for example comprise releasing the capability of the second system to edit the document (e.g., passing editing capability back to the first system or to a third system). In generally, step 470 may comprise performing continued processing generally related to the shared view. Accordingly, the scope of various aspects of the present invention should not be limited by characteristics of particular continued processing activities that the second system may perform.

Figure 5:
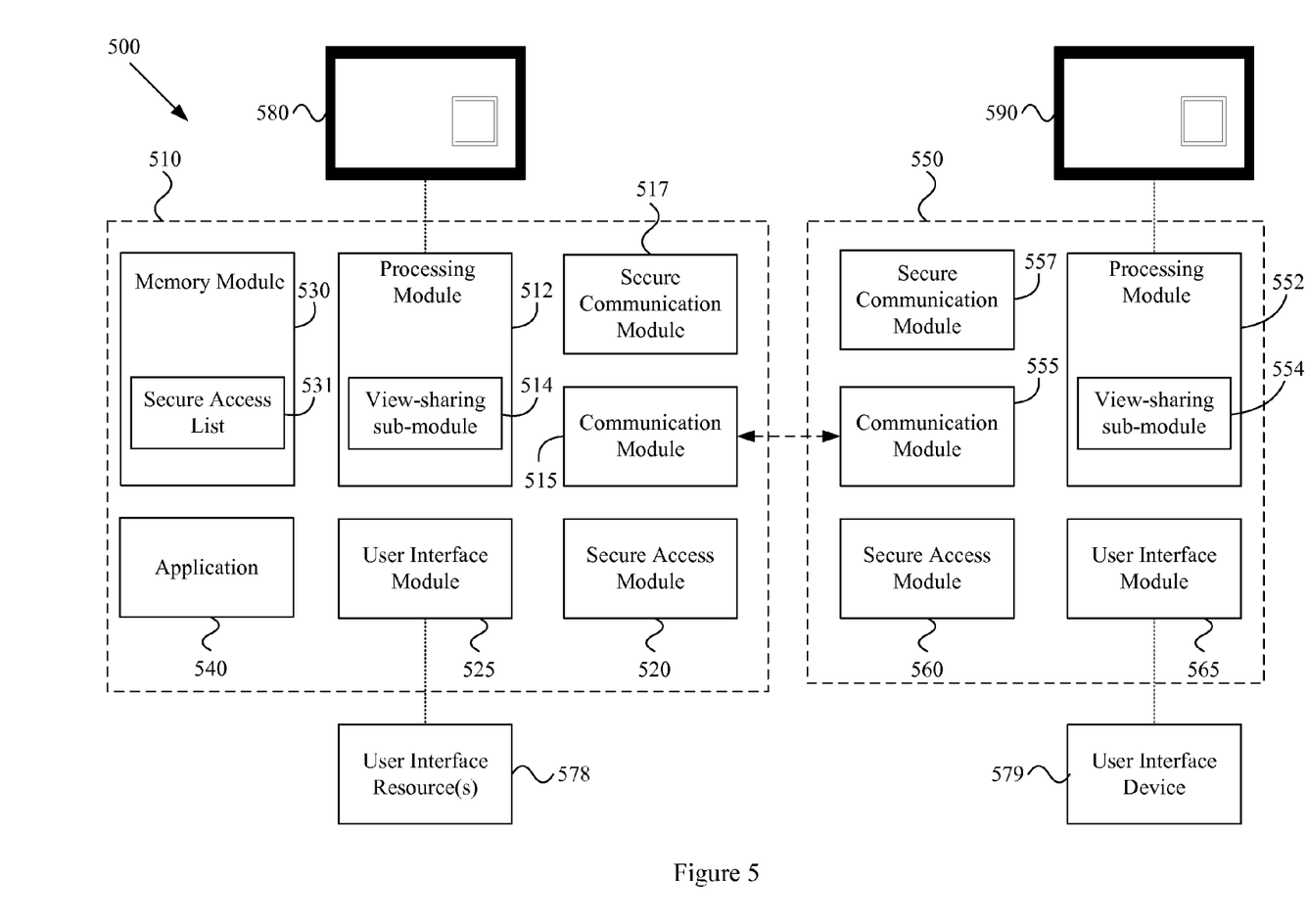
FIG. 5 is a diagram showing an exemplary system that provides view sharing, in accordance with various aspects of the present invention.

FIG. 5 is a diagram showing an exemplary system 500 that provides view sharing, in accordance with various aspects of the present invention. The exemplary system 500 may comprise a first system 510 and a second system 550.

The first system 510 may comprise a processing module 512, which may comprise a view-sharing sub-module 514. The first system 510 may comprise a communication module 515, secure communication module 517 and secure access module 520. The first system 510 may also comprise a user interface module 525, memory module 530 and an application 540. Various modules or components of the first system 510 may, for example, perform various aspects of the methods 100, 200 illustrated in FIGS. 1-2 and discussed previously.

The second system 550 may comprise a processing module 552, which may comprise a view-sharing sub-module 554.

The second system 550 may also comprise a communication module 555, secure communication module 557, and secure access module 560. The second system 550 may further comprise a user interface module 565. Various modules or components of the second system 550 may, for example, perform various aspects of the methods 300, 400 illustrated in FIGS. 3-4 and discussed previously.

The following discussion will often refer to views and view sharing. Additionally, the following discussion will also refer to various exemplary scenarios that may comprise sharing a view of a document (e.g., a word processing document, presentation document, or graphics document). Information of such an exemplary document view may, for example, be generated by the processing module 512 executing an application 540 (e.g., a document processing application) of the first system 510. It should be noted that the scope of various aspects of the present invention should not be limited by characteristics of a particular view or by how such a view may be presented to a user by various systems.

The first system 510 may comprise a processing module 512 that is communicatively coupled to a display device 580. For example and without limitation, the processing module 512 may communicate view information to a display driver that, in turn, drives components of the display device 580 to present the view in a human-perceivable form. Characteristics of the view may change at various points in the viewing process. The view may be dynamic or static. That is, the view may comprise an image that is not changing and/or an image that is changing. In general, the view may comprise any of a large variety of view characteristics.

For example, in an exemplary scenario, the display device 580 may present a view to a user in a window format. The user may then, for example, vary characteristics of the view and/or window. For example and without limitation, the user may alter the dimensions of the window or reduce the view to an icon when not immediately using the view. Alternatively, for example, a view may occupy an entire display screen or multiple screens of the display device 580.

The processing module 512 may be communicatively coupled to the communication module 515. The communication module 515 may establish a two-way wireless communication link between the first system 510 and the second system 550. For example and without limitation, the communication module 515 may perform such communication link establishment in accordance with step 140 of the method 100 illustrated in FIG. 1 and discussed previously.

The exemplary system 500 illustrates a two-system view-sharing scenario for the sake of clarity. However, various aspects of the present invention readily extend to dynamic wireless communication networks comprising more than two systems. For example and without limitation, the first system 510 may share a view with two systems, three systems, or other number of systems in the dynamic wireless communication network. Accordingly, the scope of various aspects of the present invention should not be limited by characteristics of view sharing between only two systems.

The communication module 515 may establish the two-way wireless communication link between the first system 510 and the second system 550 using any of a variety of communication media and protocols. For example, the two-way wireless communication link may comprise an RF communication link and/or an optical communication link. Also for example, the two-way wireless communication link may be based on any of a large number of standard or propriety communication protocols. Various standard communication protocols may, for example, comprise IEEE 802.11, 802.15, Bluetooth, or ultra-wideband (UWB) communication protocols. Accordingly, the scope of various aspects of the present invention should not be limited by characteristics of a particular wireless communication medium and/or communication protocol.

The first system 510 may, for example, through the communication module 515, receive a request for the first system 510 to share a view with the second system 550. For example and without limitation, the first system 510 may receive such a request in accordance with step 150 of the method 100 illustrated in FIG. 1 and discussed previously. Such a request may, for example, originate from the first system 510 or the second system 550 (e.g., from a user of the first system 510 or a user of the second system 550). Such a request may, for example, comprise a request for a particular view or any view.

In an exemplary scenario, a user of the second system 550 may initiate a request at a user interface device 579 communicatively coupled to a user interface module 565 of the second system 550. The second system 550 may then, for example, utilize a communication module 555 to communicate the request to the first system 510. In another exemplary scenario, the first system 510 may communicate with the second system 550 to ask the second system 550 (or user thereof) whether the second system 550 desires to share a particular view of the first system 510.

In an additional exemplary scenario, a user of the first system 510 may initiate a view-sharing request at a user interface device 578 communicatively coupled to a user interface module 525 of the first system 510. In general, the first system 510 may receive a request to share a view with the second system 550. Accordingly, the scope of various aspects of the present invention should not be limited by characteristics of a particular request (or source thereof) for sharing a view or mechanism for handling such a request.

Still further, for example, the first system 510 may communicate view information to the second system 550 without an explicit request from the second system 550 for the first system 510 to share the view. In an exemplary scenario, a user of the first system 510 may select the second system from a list of systems in the wireless communication network. The first system 510 may respond to the user request by communicating information of the view to the second system 550 without receiving a request from the second system 550. Accordingly, the scope of various aspects of the present invention should not be limited by whether or not the second system 550 or user thereof requests the first system 510 to share a view with the second system 550.

The processing module 512 of the first system 510 may be communicatively coupled to the secure access module 520. The processing module 512 may utilize the secure access module 520 to determine whether to share a view with the second system 550 (e.g., the second system 550 or user thereof). For example and without limitation, the secure access module 520 may utilize the user interface module 525 and/or display 580 to communicate with a user of the first system 510 to determine whether the second system 550 should have access to the view. Alternatively, for example, the secure access module 520 may analyze a list of authorized systems and/or users 531 to determine whether the second system 550 should have access to the view. Such a list 531 may, for example, reside in the memory module 530 or other memory accessible to the first system 510. Also for example, in a scenario involving sharing a view that comprises sensitive information, the secure access module 520 may analyze the secure communication capability of the second system 550 to determine whether the second system 550 has the necessary secure communication capability to protect the sensitive information in the view.

Further, for example, the secure access module 520 may communicate a variety of authorization and authentication information with the second system 550. In general, the secure access module 520 may perform any of a variety of authorization and/or authentication operations. Accordingly, the scope of various aspects of the present invention should not be limited by characteristics of particular way of determining whether to share the view with the second system or by characteristics of particular mechanisms for performing such a determination.

If, for example, the secure access module 520 determines that the second system 550 is not authorized to share the view, then the first system 510 (e.g., the view-sharing sub-module 514) may terminate processing related to sharing the view between the first system 510 and the second system 550. Alternatively, for example, if the secure access module 520 determines that the second system 550 is authorized to share the view, then the first system 510 (e.g., the view-sharing sub-module 514) may continue processing related to sharing the view between the first system 510 and the second system 550. For example, the first system 510 may perform various aspects of step 170 of the method 100 illustrated in FIG. 1 and discussed previously.

The view-sharing sub-module 514 may, for example, perform various view-sharing processing for the first system 510. For example, the view-sharing sub-module 514 may utilize the communication module 515 to communicate information of the view to the second system 550 in any of a variety of ways. For example and without limitation, the view-sharing sub-module 514 may communicate JPEG and/or MPEG encoded information to the second system 550. Also for example, the view-sharing sub-module 514 may communicate graphical, pictorial and textual information to the second system 550.

The view-sharing module 514 may, for example, communicate information of the view to the second system 550 over a wireless communication link established by the communication module 515. Alternatively, for example, the view-sharing sub-module 514 may utilize the communication module 515 to establish additional communication links or channels over which to communicate information of the view to the second system 550. Accordingly, the scope of various aspects of the present invention should not be limited by characteristics of particular view information types or characteristics of particular communication links or channels utilized to communicate the view information from the first system to the second system.

The first system 510 may comprise a secure communication module 517. The first system 510 may, for example, utilize the secure communication module 517 to establish a secure wireless communication link (e.g., one-way or two-way) between the first system 510 and the second system 550. For example, in a scenario where the shared view comprises sensitive information, the first system 510 (e.g., the view-sharing sub-module 514) may utilize the secure communication module 517 to establish a secure communication link comprising encryption and decryption of at least the sensitive information in the shared view. The first system may, for example, utilize the secure communication module 517 to add secure communication capability to a new wireless communication link or a pre-existing wireless communication link (e.g., a wireless communication previously established by the communication module 515).

The view-sharing module 514 may, for example, perform additional processing steps for utilizing the shared view. For example, the first system 510 and/or second system 550 may communicate information to modify and/or edit the shared view. For example, the first system 510 may provide the second system 550 (e.g., a user thereof) the capability to modify aspects of the original shared view at the first system 510. The first system 510 may then, for example, receive and process view modification information received from the second system 550.

In one exemplary scenario, the first system 510 may provide the second system 550 the ability to control movement or other characteristics of the original view at the first system 510. The first system 510 may then, for example, receive view modification information from the second system 550. In another exemplary scenario, the first system 510 may provide the second system 550 the ability to edit a document in the original view at the first system 510. The first system may then, for example, receive document-editing information from the second system 550.

In an exemplary scenario, the shared view may comprise a view of a document, and the first system 510 may provide the second system 550 the capability to view and edit the document of the view. The following discussion will focus on this exemplary scenario. Note, however, that characteristics of the following exemplary scenario should by no means limit the scope of various aspects of the present invention.

In the exemplary scenario, a user of the first system 510 or the second system 550 may request that the first system 510 share a view with the second system 550. Additionally, a user of the first system 510 or the second system 550 may request that the first system 510 provide the second system 550 the capability to edit the document.

The first system 550 (e.g., the view-sharing sub-module 514) may provide to the second system 550 the capability to edit the document in the shared view. The first system 510 may, for example and without limitation, provide such capability to the second system 550 in accordance with step 220 of the method 200 illustrated in FIG. 2 and discussed previously. The first system 510 may, for example, communicate to the second system 550 that the second system 550 (e.g., a user thereof) may edit a document in the shared view. As an example, the first system 510 may pass a token to the second system 550 indicating that the second system 550 has editing privileges for the document.

To provide such capability to the second system 550, the first system 510 may initialize various operational and communicational characteristics of the first system 510 to be able to receive and process document-editing information from the second system. For example, the first system 510 may utilize the communication module 515 to initialize a communication link over which such document editing information may be communicated. Also for example, the first system 510 may utilize the secure communication module 517 to initialize a secure communication link over which sensitive document editing information may be communicated. In general, the first system 510 may provide the capability to the second system 550 to edit a document in a shared view. Accordingly, the scope of various aspects of the present invention should not be limited by characteristics of a particular way or mechanism for providing the document editing capability to the second system 550.

Continuing the exemplary scenario, the first system 510 may utilize the communication module 515 to receive document-editing information from the second system 550. The first system 510 may, for example, receive such document editing information in accordance with step 230 of the method 200 illustrated in FIG. 2 and discussed previously. For example, a user of the second system 550 may use the user interface device 579 coupled to the second system 550 to type, modify graphics, cut and paste elements, and generally perform any editing capability as though the document and associated processing application were residing on the second system 550. This may be the case, for example, even though the second system 550 may not include the data associated with the original document or the particular document processing application that is generating the original view of the document at the first system 510. The first system 510 may generally receive document-editing information from the second system 550. Accordingly, the scope of various aspects of the present invention should not be limited by characteristics of particular types of editing information or particular ways or mechanisms for communicating such information.

The first system 510 may, for example, edit the original document of the view according to document editing information received from the second system 550. The first system 510 may, for example and without limitation, perform such editing in accordance with step 240 of the method 200 illustrated in FIG. 2 and discussed previously. For example, the first system 510 may receive any of a large variety of editing commands from the second system 550 (e.g., cut, paste, delete, insert text, cursor movement, drawing selection, etc.). The first system 510 (e.g., the processing module 512) may process the editing commands from the second system 550 as though the commands originated at the first system 510. For example, the processing module 510 may execute the application 540 (e.g., a document processing application) generating the document in a manner that is independent of the source of the editing commands.

In an exemplary illustration, the first system 510 may create an editing command path from the second system 550 through the communication module 515. The first system 510 may then replace the typical editing command path from the user interface module 525 of the first system 510 with the command path from the second system 550. In general, the first system 510 (e.g., the processing module 512 executing the application 540) may edit the original document of the view according to document editing information received from the second system 550. Accordingly, the scope of various aspects of the present invention should not be limited by characteristics of particular ways of processing such editing commands.

Continuing the exemplary scenario, the first system 510 may display the view comprising the edited document. The first system 510 may, for example and without limitation, perform such view displaying in accordance with step 250 of the method 200 illustrated in FIG. 2 and discussed previously. For example, after the processing module 512 utilizes the application 540 (e.g., the document processing application) to edit the document of the view according to instructions from the second system 550, the processing module 512 may provide information of a view comprising the edited document to the display device 580. In such an exemplary scenario, a user of the first system 510 can view changes made to a document by a user of the second system 550.

The first system 510 may communicate information of the view comprising the edited document to the second system 550. The first system 510 may, for example and without limitation, perform such communication in accordance with step 260 of the method 200 illustrated in FIG. 2 and discussed previously. For example, the view-sharing sub-module 514 may communicate information of the view to the second system 550 via the communication module 515. In such an exemplary scenario, a user of the second system 550 that is generating the document editing commands may view the document modifications resulting from the user's editing commands.

The first system 510 may, for example, perform a variety of further processing related to the shared view in accordance with commands provided by a user of the second system 550 and/or a user of the first system 510.

Returning to the general discussion of the system 500 illustrated in FIG. 5, the second system 550 may establish a two-way wireless communication link with the first system 510. The second system 550 may, for example and without limitation, establish such a communication link in accordance with step 320 of the method 300 illustrated in FIG. 3 and discussed previously. For example, the second system 550 may comprise a communication module 555 that establishes a two-way wireless communication link between the second system 550 and the first system 510.

The second system 550 may comprise a secure communication module 557 that may integrate secure communication capability into the two-way wireless communication link. For example, in an exemplary scenario where information of the shared view (or other communicated information) is sensitive, the second system 550 may communicate with the first system 510 to establish a secure communication link between the second system 550 and the first system 510. Such a secure communication link may, for example, comprise performing any of a large variety of secure communication techniques (e.g., encryption and frequency hopping). Accordingly, the scope of various aspects of the present invention should not be limited by characteristics of particular secure communication techniques or mechanisms.

The second system 500 may comprise a secure access module 560 that may, for example, obtain and communicate secure access information with the first system 510. For example, in an exemplary scenario where the shared view comprises sensitive information, or where other communicated information between the second system 550 and the first system 510 may be sensitive, the first system 510 may require that the second system 550 (or user thereof) be authorized to access the view. For example, the first system 510 may have access to a list of authorized systems and/or users that may access the view.

The first system 510 may, for example, require the second system 550 to communicate any of a variety of secure access information (e.g., authorization or authentication information) to the first system 510. Such information may, for example, comprise system identification information and user identification information (e.g., user ID and password, retinal scan, thumb print, facial pattern information, voice patter information). The second system 550 (e.g., the secure access module 560) may then communicate any necessary secure access information to the first system 510 (e.g., the secure access module 520) for the first system 510 to utilize in determining whether the second system 550 should be allowed access to the view. The secure access module 560 may generally communicate secure access information with the first system 510. Accordingly, the scope of various aspects of the present invention should not be limited by characteristics of particular secure access information, communication or processing techniques.

The second system 550 may communicate a request to the first system 510 for the first system to share a view with the second system 550 (e.g., a view that the first system is currently displaying). For example and without limitation, the second system 550 may communicate such a request in accordance with step 330 of the method 300 illustrated in FIG. 3 and discussed previously.

Such a request, for example, may comprise an open request for a view or may comprise a request for a specific view. Such a request may, for example, originate from a user of the user interface device 579 that is communicatively coupled to the user interface module 565 of the second system 550. Such a request may, for example, be in response to an offer to provide a view that was communicated to the second system 550 by the first system 510.

The second system 550 may utilize the communication module 555 to communicate such a request to the first system 510 over a wireless communication link. In general, the second system 550 may communicate a request to the first system 510 to share a view with the second system 550. Accordingly, the scope of various aspects of the present invention should not be limited by characteristics of a particular request, request type, request source, or way of communicating such a request.

The second system 550 may receive information of the shared view from the first system 510. For example and without limitation, the second system 550 may receive information of the view in accordance with step 340 of the method 300 illustrated in FIG. 3 and discussed previously. The second system 550 may, for example, utilize the communication module 555 to receive information of the view from the first system 510. Such information may, for example, have been communicated to the second system 550 by the first system 510 in accordance with method step 190 of the method 100 illustrated in FIG. 1 and discussed previously.

The second system 550 may receive information of the view in a variety of ways. For example and without limitation, the second system 550, through the communication module 555, may receive JPEG and/or MPEG encoded information from the first system 510. Also for example, the second system 550 may receive graphical, textual or pictorial information from the first system 510.

In general, the second system 550 may receive information of the view from the first system 510. Accordingly, the scope of various aspects of the present invention should not be limited by characteristics of a particular view, view type or way of communicating information of a view.

The second system 550 may display the view on the display device 590, which may be communicatively coupled to the second system 550 (e.g., to the processing module 552 of the second system 550). For example and without limitation, the second system 550 may display the view in accordance with step 350 of the method 300 illustrated in FIG. 3 and discussed previously.

The second system 550 may, for example, utilize the view-sharing sub-module 554 of the processing module 552 to process the view information received from the first system 510. The view-sharing sub-module 554 may then communicate information of the view to the display device 590 (e.g., to display driving circuitry corresponding to the display device 590).

Characteristics of the view may change at various points in the viewing process. As mentioned previously, the view may comprise any of a large variety of view characteristics. The second system 550 may, for example, provide a user of the second system 550 the capability to adjust certain characteristics of the displayed view (e.g., view size, or changing a view between window form and icon form).

For example, in an exemplary scenario, the display device 590 coupled to the second system 550 may present a view to a user in a window format. The user may then, for example, vary characteristics of the view and/or window. For example and without limitation, the user may alter the dimensions of the window or reduce the view to an icon when not immediately using the view. Alternatively, for example, a view may occupy an entire display screen or multiple screens of the display device 590.

In general, the second system 550 may communicate information of the view to a display device. Accordingly, the scope of various aspects of the present invention should not be limited by characteristics of a particular view, view display, or way or displaying a view.

The second system 550 may, for example, perform additional processing steps related to the shared view. For example, the second system 550 and/or first system 510 may communicate information to modify and/or edit the shared view. For example, the second system 550 may receive from the first system 510 the capability to modify aspects of the original shared view at the first system 510. The second system 550 may then, for example, provide view modification information to the first system 510 for further processing.

In an exemplary scenario, the shared view may comprise a view of a document, and the second system 550 may receive from the first system 510 the capability to view and edit the document of the view. The following discussion will focus on this exemplary scenario. Note, however, that characteristics of the following exemplary scenario should by no means limit the scope of various aspects of the present invention.

In the exemplary scenario, a user of the second system 550 (e.g., using the user interface device 579) or a user of the first system 510 (e.g., using the user interface device 578) may request that the first system 510 share a view comprising a view of a document with the second system 550. Additionally, a user of the second system 550 or the first system 510 may request that the first system 510 provide the second system 550 the capability to edit the document.

The second system 550 may receive an indication from the first system 510 that the second system 550 may edit a document of the shared view. The second system 550 may, for example and without limitation, receive such an indication in accordance with step 420 of the method 400 illustrated in FIG. 4 and discussed previously. For example, the processing module 552 (or view-sharing module 554) may receive such an indication in a signal received by the communication module 555 from the first system 510 over a wireless communication link.

For example, the indication may be communicated to the second system 550 by a first system 510 operating according to step 220 of the method 200 illustrated in FIG. 2 and discussed previously. The first system 510 may, for example, utilize the communication module 515 of the first system 510 to communicate to the second system 550 that the second system 550 (e.g., a user thereof) may edit a document in the shared view. As an example, the second system 550 may receive a token from the first system 510 (or other system) indicating that the second system 550 has editing privileges for the document.

The second system 550 may also, for example, initialize various operational and communicational characteristics of the second system 550 to be able to receive, process and communicate document editing information (e.g., from a user of the user interface device 579 communicatively coupled to the user interface module 565 of the second system 550) and communicate such document editing information to the first system 510. Such initialization may comprise, for example, utilizing the communication module 555 and/or the secure communication module 557 to establish a communication link over which such document editing information may be communicated to the first system 510.

In general, the second system 550 may receive an indication from the first system 510 (or other system) that the second system 550 has the capability to edit a document in a view shared by the first system 510. Accordingly, the scope of various aspects of the present invention should not be limited by characteristics of a particular way of receiving document-editing capability from the first system.

The second system 550 may, for example, receive document-editing information (e.g., commands) from a user of the second system 550. For example and without limitation, the second system 550 may receive such document editing information in accordance with step 430 of the method 400 illustrated in FIG. 4 and discussed previously.

For example, a user of the second system 550 may utilize the user interface device 579 to communicate document-editing information to the second system 550 via the user interface module 565. Such a user interface device 579 may, for example, comprise a keyboard, mouse, voice recognition device, touch screen, touch pad, etc. Such document editing information may, for example, comprise textual information, pictorial information, graphical information, cursor information, etc.

In general, the second system 550 may receive document-editing information from a user of the second system 550. Accordingly, the scope of various aspects of the present invention should not be limited by characteristics of a particular user interface device or of a particular type of document editing information.

The second system 550 may, for example, communicate document-editing information to the first system 510. The second system 550 may, for example and without limitation, communicate such information to the first system 510 in accordance with step 440 of the method 400 illustrated in FIG. 4 and discussed previously. For example, the view-sharing sub-module 554 may utilize the communication module 555 to communicate document-editing information to the first system 510. The document editing information may, for example, comprise any of a large variety of document editing information types, some of which were discussed previously.

The second system 550 may communicate such document editing information to the first system 510 in a variety of ways. For example, the second system 550 may utilize a wireless communication link established between the communication module 555 of the second system 550 and a communication module 515 of the first system 510. Such a wireless communication link may, for example, comprise a wireless communication link as established at step 320 in the method 300 illustrated in FIG. 3 and discussed previously. For example, such a wireless communication link may comprise a secure wireless communication link.

In general, the second system 550 may communicate document-editing information to the first system 510. Accordingly, the scope of various aspects of the present invention should not be limited by characteristics of particular document editing information or a way or mechanism for communicating such information.

The second system 550 may receive from the first system information of a view comprising a view of the document edited in accordance with the document editing information provided to the first system 510 by the second system 550. For example and without limitation, the second system 550 may receive such information in accordance with step 450 of the method 400 illustrated in FIG. 4 and discussed previously.

For example, the first system 510 may have edited the document or modified a view thereof in accordance with the editing information communicated to the first system 510 by the second system 550. Continuing the example, the first system 510 may then have communicated information of the edited document or view to the second system 550.

In an exemplary scenario, a user of the second system 550 may enter a keyboard command on the user interface device 579 to delete a text character in the document. The second system 550 may receive editing information for the deleted character via the user interface module 565 and communicate such information to the first system 510 via the communication module 555. The first system 510 may edit the document or view thereof according to the information of the text character deletion received from the second system 550. The first system 510 may then communicate information of the edited document or modified view to the second system 550, which may receive such modified view or edited document information.

In general, the second system 550 may receive information from the first system 510 of a view of the edited document (or modified view). Accordingly, the scope of various aspects of the present invention should not be limited by characteristics of particular view information or ways of communicating or processing such view information.

The second system 550 may display the view comprising the edited document in accordance with information received from the first system 510. For example, the processing module 552 (e.g., the view-sharing sub-module 554) may provide the view information to the display device 590, which in turn, may display the view. For example, this may enable a user of the second system 550 to enter editing commands and view the effects of the editing commands in an expedient manner (e.g., in near real-time).

A displayed view may, for example, comprise any of a variety of view characteristics as discussed previously. In general, the second system 550 (or a display device coupled thereto) may display a view of the edited document or modified view thereof. Accordingly, the scope of various aspects of the present invention should not be limited by characteristics of a particular view or way of displaying such a view.

The second system 550 may, for example, perform a variety of additional processing related to the shared view. For example and without limitation, the second system 550 may provide for additional editing of the document using various resources of the second system 550. The second system 550 may also, for example, release the capability of the second system 550 to edit the document (e.g., passing editing capability back to the first system 510 or to a third system). In generally, the second system 550 may perform continued processing related to the shared view. Accordingly, the scope of various aspects of the present invention should not be limited by characteristics of particular continued processing activities that the second system 550 may perform.

The various systems and modules illustrated in the exemplary system 500 of FIG. 5 may, for example, be implemented in hardware or software. Various systems and modules may for example be implemented in application software or operating system functionality. For example, various modules may be integrated into a single integrated circuit. Accordingly, the scope of various aspects of the present invention should by no means be limited to particular hardware or software implementations of the various modules and components discussed previously.

Figure 6:
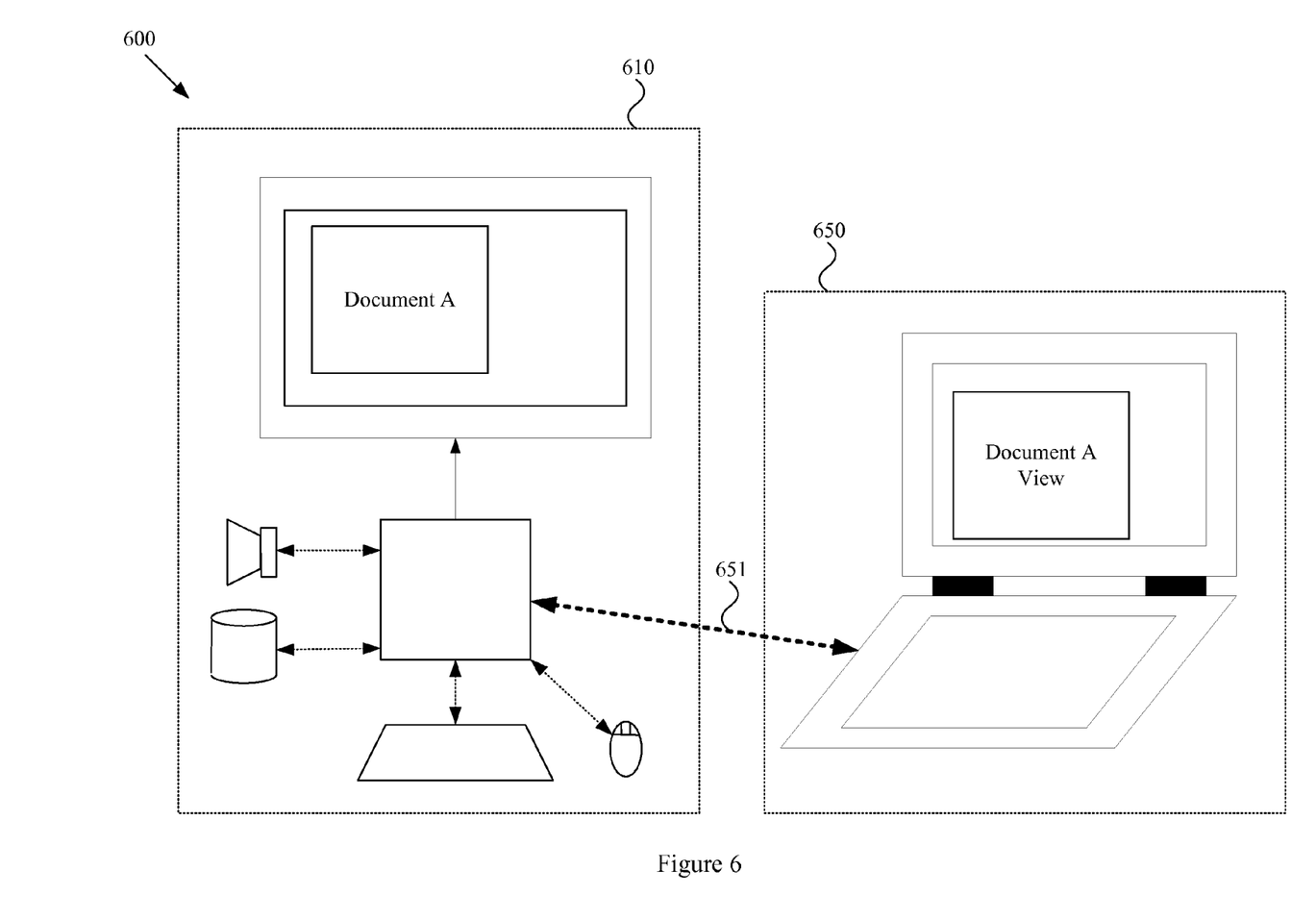
FIG. 6 is a diagram illustrating a view sharing and document-editing scenario in accordance with various aspects of the present invention.

FIG. 6 is a diagram illustrating an exemplary view sharing and document-editing scenario 600 in accordance with various aspects of the present invention. The scenario 600 is presented here to illustrate one of a large number of scenarios that may utilize various aspects of the present invention, and accordingly, the scope of various aspects of the present invention should by no means be limited by characteristics of the exemplary scenario 600.

The exemplary view sharing and document-editing scenario 600 may include a first system 610 and a second system 650. The first system 610 may, for example, comprise a desktop computing system, and the second system 650 may, for example, comprise a laptop computing system. For example, the first system 610 may communicate information of the view comprising document A to the second system 550 (e.g., using MPEG image encoding technology) over a wireless communication link 651. The second system 650 may then display the shared view of document A on a display device of the second system 650. Respective users of the first system 610 and/or the second system 650 may, for example, control the size and location of respective windows or screens on which the respective views are displayed.

As an example, view-sharing hardware (e.g., a view-sharing module) of the second system 650 may track the position and dimensions of the window on the second system 650 display. The second system 650 (e.g., a view-sharing module) may also track the movement of the second system 650 cursor and second system 650 buttons and keystrokes. For example, when the user of the second system 650 selects a position on the shared view with the cursor and begins to type, the second system 650 may communicate window information, cursor information, mouse information, keystroke information, etc. to the first system 610. The first system 610 may then, for example, convert the information received from the second system 650 to a format compatible with the first system 610. The first system 610 may then utilize the user input information from the second system 650 to modify (or edit) the original document or view on the first system 610.

Upon modifying the original document on the first system 610, the first system 610 may then communicate an updated view of the document (or view) to the second system 650. The second system 650 user may thereby edit a shared document without having an application on the second system 650 that is compatible with the application responsible for generating the original view on the first system 610. For example, the second system 650 user may edit a shared spreadsheet without having a compatible spreadsheet application.

Of course, various combinations of view-sharing functionality and application functionality are possible without departing from the spirit and scope of various aspects of the present invention. For example and without limitation, view-sharing functionality of the first system 610 and the second system 650 may comprise communicating view information and editing information in a way that is efficiently understood by compatible document processing applications executing on the first system 610 and the second system 650.

In summary, various aspects of the present invention provide a system and method for sharing a view between systems in a dynamic wireless network environment. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method comprising:
in a first system:
establishing a direct wireless communication link with a second system in which the direct wireless communication link does not connect through any intermediate system between the first system and the second system;
sending, through the direct wireless communication link, a view sharing request to the second system, where the view sharing request specifies a view displayed by the second system that is not presently displayed by the first system;
receiving, through the direct wireless communication link, view information corresponding to the view displayed by the second system and specified by the view sharing request;
displaying, with the first system, the view according to the view information received from the second system;
receiving, through the direct wireless communication link, view adjustment information specifying a change in view characteristics of the displayed view; and
adjusting characteristics of the displayed view in the first system according to the view adjustment information without adjusting how the view is displayed in the second system.

2. The method of claim 1, comprising:
establishing multiple communication links with the second system, including the direct wireless communication link.

3. The method of claim 2, comprising:
receiving, through the multiple communication links, the view information corresponding to the view displayed by the second system.

4. The method of claim 3, where establishing multiple communication links comprises:
establishing a secure communication link with the second system; and
where receiving the view information comprises:
receiving selected sensitive information of the view information through the secure communication link.

5. The method of claim 4, where receiving the view information further comprises:
receiving non-sensitive information of the view information through the secure communication link.

6. The method of claim 1, where establishing a direct wireless communication link comprises:
establishing a direct Bluetooth communication link with the second system.

7. The method of claim 1, where establishing a direct wireless communication link comprises:
establishing a direct 802.11 wireless communication link with the second system.

8. The method of claim 1, wherein adjusting characteristics of the displayed view in the first system comprises adjusting the view in the first system without adjusting how the view is displayed in the second system.

9. The method of claim 1 wherein displaying the view according to the view information comprises displaying a window including the view and wherein receiving the view adjustment information comprises receiving window size adjustment information and wherein adjusting characteristics of the displayed view comprises changing window size of the window including the view.

10. A device comprising:
a user interface;
a communication interface; and
view sharing circuitry in communication with the user interface and the communication interface, the view sharing circuitry operable to:
establish a wireless communication link with a second device through the communication interface;
send, through the wireless communication link, a video sharing request to the second device, where the video sharing request specifies a video displayed by the second device that is not presently displayed through the user interface;

receive, through the wireless communication link, video information corresponding to the video displayed by a second system and specified by the video sharing request;

display, through the user interface, the video according to the video information received from the second device while the second device displays the video at the same time;

receive, through the wireless communication link, display adjustment information specifying a change in view characteristics of the displayed video; and adjust the displayed video in the user interface according to the display adjustment information without adjusting how the view is displayed in the second system.

11. The device of claim 10, where the view sharing circuitry is operable to establish, through the communication interface, multiple communication links with the second device, including the wireless communication link.

12. The device of claim 11, where the view sharing circuitry is operable to receive, through the multiple communication links, the video information corresponding to the video displayed by the second device.

13. The device of claim 12, where:
the multiple communication links include a secure communication link with the second device; and
where the video information comprises selected sensitive information of the video information sent through the secure link.

14. The device of claim 13, where the video information comprises non-sensitive information of the video information sent through the secure communication link.

15. The device of claim 10, where the wireless communication link comprises a Bluetooth communication link.

16. The device of claim 10, where the wireless communication link comprises an 802.11 wireless communication link.

17. The device of claim 10, wherein the view sharing circuitry is operable to adjust the displayed video in a first system without adjusting how the displayed video is displayed in the second system.

18. The device of claim 10, wherein displaying the video according to the view information comprises displaying, through the user interface, a window including the video and wherein receiving the display adjustment information comprises receiving window size adjustment information and wherein adjusting the displayed video comprises changing window size of the window including the video on the user interface.

19. A product comprising:
a non-transitory machine readable medium; and
logic stored on the non-transitory machine readable medium, that when executed by a processor of a first system, causes the first system to:
establish a wireless communication link with a second system different from the first system;
send a view sharing request to the second system, where the view sharing request specifies a view displayed by the second system that is not presently displayed by a first system;
receive, through the wireless communication link, view information corresponding to the view displayed by the second system and specified by the view sharing request;
display the view according to the view information received from the second system;
receive a display adjustment specifying a change in how to display the view on the first system; and
adjust the display of the view in the first system according to the display adjustment without adjusting how the view is displayed in the second system.

20. The product of claim 19, where the display adjustment specifies changing a window size of a window displaying the view.

21. The product of claim 19, where the display adjustment specifies minimizing the display of the view to an icon.

22. The product of claim 19, where the processor executable instructions cause the first system to establish multiple communication links with the second system, including the wireless communication link.

23. The product of claim 22, where the processor executable instructions cause the first system to receive, through the multiple communication links, the view information corresponding to the view displayed by the second system.

24. The product of claim 19, where the processor executable instructions cause the first system to add a secure communication capability to the wireless communication link.

* * * * *